May 15, 1945. H. D. HUME 2,375,848
HARVESTING EQUIPMENT
Filed March 22, 1943 2 Sheets-Sheet 1
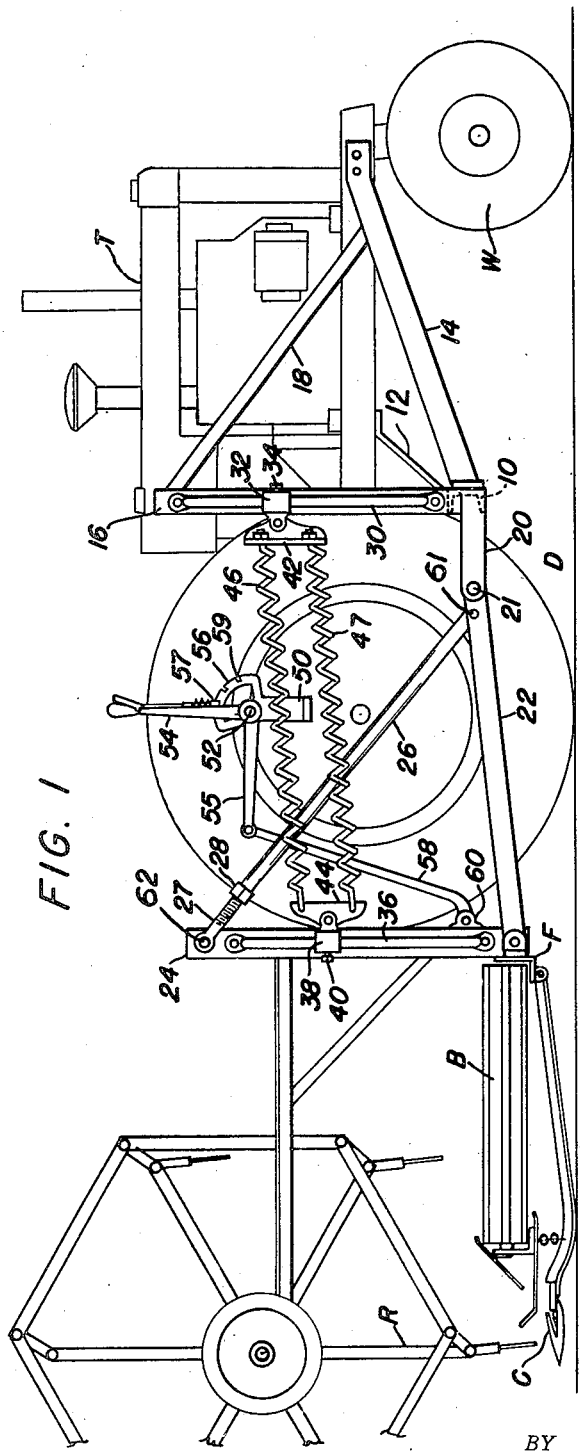
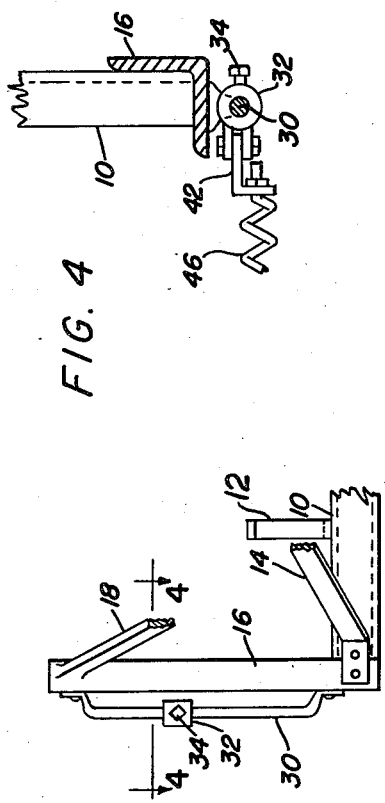
HORACE D. HUME
INVENTOR
BY Herbert E. Smith
ATTORNEY

HORACE D HUME
INVENTOR

Patented May 15, 1945

2,375,848

UNITED STATES PATENT OFFICE 2,375,848

HARVESTING EQUIPMENT

Horace D. Hume, Mendota, Ill.

Application March 22, 1943, Serial No. 479,966

12 Claims. (Cl. 56—23)

This invention relates to harvesting equipment and, more particularly, to push harvesting equipment of the type directly connected to, supported by a tractor and moved over the ground in advance of the tractor during a harvesting operation.

While it is true that push harvester equipment is not per se new to the art, it is true and well known that the prior devices in this field have their limitations and are in some respects not entirely satisfactory. One of the previously thought necessary requirements in push harvesters has been the provision of ground engaging members for the support of the harvesting equipment, in which instance the tractor therebehind is only a prime mover and not the support for the harvester. In such a case there is a disadvantage in the operation of the harvesting equipment due to the inflexibility of the equipment with respect to the ground surface. On the other hand, attempts have been made to support the harvesting equipment in advance of the tractor and from the tractor without necessitating ground engaging members thereon. If the equipment is inflexibly supported from the tractor, the same defect of inflexibility as above is attendant upon the operation of the mechanism. If the equipment is flexibly supported from the tractor, its operation has been accompanied by excessive vertical movement due to shocks and vibrations imparted through the tractor to the equipment due to uneven ground conditions. Also a particularly detracting defect of the prior equipment is that it is usually complicated and therefore not easily attached to or detached from the tractor, since it is uneconomical to keep such traction means continually fastened to harvesting equipment which is only used during part of the year.

Having in mind the defects of the prior art harvesting equipment, it is an object of my invention to provide supporting means and attaching means for connecting and flexibly supporting harvesting equipment in advance of a tractor, and which means may be easily attached as well as adjusted for use.

Another object of my invention is to provide, in harvesting equipment of the type described, a resilient link element which flexibly supports the harvester cutting and crop handling equipment in advance of the tractor in an adjusted plane and without undue bouncing or movement.

A still further and more specific object of my invention is the provision, in harvesting equipment of the type described, of means for inflexibly connecting the harvesting equipment to the tractor in a raised position with respect to the ground surface and yet unaffected thereby when the equipment is being moved over rough and uneven surfaces, as from field to field.

The foregoing objects and others ancillary thereto I prefer to accomplish as follows:

According to a preferred embodiment of my invention, I attach a beam to the frame of a tractor laterally thereof in the mid section. This beam is suitably braced for rigidity and carries at one or both ends a suitably braced mast and, as well, forwardly extending horns adapted on the forward ends to form pivots. Laterally of the tractor, in advance thereof, is positioned the harvesting equipment which, in this exemplary description, comprises a cutter bar, crop handling reel and laterally operable draper associated together with a harvesting frame. To each forwardly extending horn on the lateral beam attached to the tractor and the harvester frame is a push bar pivotally connected to the horn. Either included as a structural element of the harvesting frame or as a separate element thereon, is an upright post that is suitably tied to a rear portion of the push bar by an adjustable brace. In each instance the mast and the upright post has guideways or slideways upon which a slider is vertically movable. Each of the sliders is adapted, as in this instance by set screws, to be securely locked in a desired position. Between the sliders is a resilient link shown here as a tension spring that tends to draw the upright post toward the mast about the pivotal connection between the push bar and the tractor. Also mounted on the tractor is means for inflexibly connecting the harvesting equipment, in a raised position, to said tractor on such occasions as it may be desirable to place the harvesting equipment in an inoperative position.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which Figure 1 is a side view in elevation of my harvesting equipment, showing a tractor in phantom;

Figure 3 is a fragmentary sectional view of the mast carried by the tractor; and Figure 4 is an enlarged fragmentary sectional view taken on like 4—4 of Figure 3.

Figure 2:
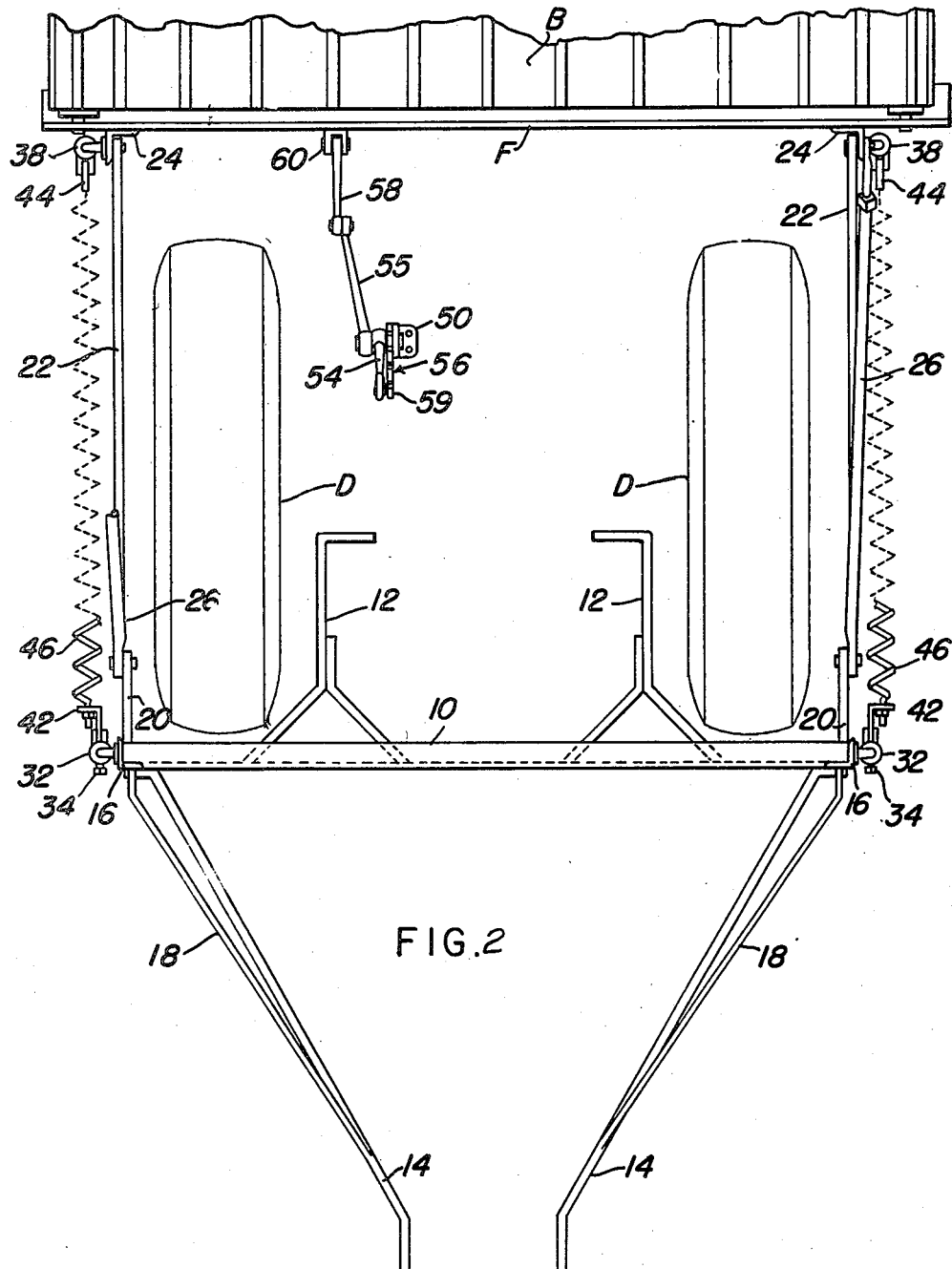
Figure 2 is a plan view of the connecting elements used between the tractor and the harvesting equipment according to my invention.

Harvesting equipment, to overcome the defects hereinbefore enumerated, must have two totally distinct characteristics; it must be capable of flexibly supporting the cutting and crop handling equipment; and it must also be simple in construction, attachment and adjustment for use in connection with a tractor. Accordingly, a preferred embodiment of my invention, referring to Figures 1 and 2 of the drawings, is constituted by a tractor T, here shown in phantom, having mounted thereon a lateral beam 10. In this instance the tractor T is shown as a rubber-tired vehicle having the main drive wheels D forwardly positioned and trailing tiller wheels W at the rear end. The beam 10 is mounted on the mid portion of the tractor, preferably to the rear of the wheel D and laterally thereof, by means of the braces 12 which are tied suitably to adjacent portions of the frame (not shown) of the tractor. Extending rearwardly of the beam 10 to insure rigidity of attachment of the beam is the brace 14. Another similar brace is used on the other side of the vehicle.

Rising at either end of the beam 10 is a mast 16 each of which, by means of brace 18 extending between the upper end of the mast and brace 14, is braced in this upright positioning. Extending forwardly of beam 10 at each end thereof is horn 20 to which is pivotly connected at 21 a push bar 22.

The member F is pivotly attached to the forward end of push bar 22 and such other like bars as may be employed. Member F forms a portion of the harvesting equipment which includes the draper belt B, cutting mechanism C and crop handling reel R. An upright post 24 rises from each end of member F which post is braced rearwardly by brace 26 connected to bar 22 at 61 and to post 24 at 62. Brace 24 is of variable length to alter the angular relation of post 24 to bar 22, this adjustment being obtained by means of screw 27 and nut 28.

On the mast 16 is a guide or slideway 30 having vertically movable thereon the slider 32 which may be secured in position by means of set screw 34. Similarly, the post 24 carries a slideway 36 having a slider 38 locked in position by means of set screw 40. Yokes 42 and 44 are pivotally connected to the sliders 32 and 38 respectively and between them is connected a pair of resilient springs 46, 47, which, in effect, are resilient links between the mast 16 and the upright post 24. By moving the sliders 32 and 38 upward or downward on the slideways 30, 36 respectively the tension applied on the fixed mast 16 to the mast 24, swinging about the pivot 21, may be varied according to the desire of the operator of such equipment.

A support member 50 is suitably mounted upon a tractor at any convenient location and provides a pivot 52 for a bell crank comprising arms 54, 55 and for a quadrant 56. A link 58 between arm 55 of the bell crank and the connector 60 on the harvester frame permits, when the handle 54 is swung about the pivot, the raising of the harvester with respect to the ground surface. When the latch 57 is engaged in a notch 59, the harvesting equipment will be secured in raised position above the ground surface and inflexibly connected to the tractor means.

The structure set forth above while suitable for an all purpose harvester is especially designed and useful in connection with the harvesting of vine crops, such as peas and beans, which during their growing period and at harvest time lie upon the ground and have to be raised at the time of cutting to insure that damage to the crop will be avoided. The harvesting structure that I have therefore illustrated and described in connection with this application is especially valuable in connection with what is commonly termed a floating type cutter bar and a header which for its best performance can be maintained substantially horizontal with the ground and in which the cutter bar follows closely the ground contour for accomplishing its best performance.

Since my structure is under balance, that is since the counter-balancing springs are adjusted to carry the weight of the apparatus which they support and the additional weight of the crop that will be engaged by the cutter bar and carried laterally across the draper, it will be evident that the harvester in its progress across the field is under the immediate control of the tractor operator and the lever for raising and lowering the bar requires little or no effort to cause it to follow the ground or to avoid any ridge, hump or other obstructions that may be in the path of the machine. With such a control it is extremely easy to maintain the cutting elements adjusted to the nature of the field and to the assurance that the crop will not be damaged but that the vines will be cut at the ground surface or closely thereto while they are lifted and passed backward after cutting to the draper.

I claim:

1. A supporting frame for harvesting equipment for use with a tractor, said frame comprising: a mast carried by said tractor, a push bar pivotally connected to said tractor and extending forwardly to and connected with the frame of the harvesting equipment, an upright post on the harvesting equipment frame in opposition to the mast on the tractor, and a resilient link connected to and extending between said post and the mast on the tractor to flexibly support the harvesting equipment in advance of the tractor.

2. A supporting frame for harvesting equipment for use with a tractor, said frame comprising: a beam laterally attached to the tractor frame, a mast carried by said beam, a push bar pivotally connected to said beam and extending forwardly to and connected with the frame of the harvesting equipment, an upright post on the harvesting equipment frame in opposition to the mast on the beam, and a resilient link connected to and extending between the said upright post and mast to flexibly support the harvesting equipment in advance of the tractor.

3. A supporting frame for harvesting equipment for use with a tractor, said frame comprising: a mast carried by said tractor, a push bar pivotally connected to said tractor and extending forwardly to and connected with the frame of the harvesting equipment, an upright post on the harvesting equipment frame in opposition to the mast on the tractor, means for maintaining a fixed relation between said mast and push bar, a resilient link connected to and extending between said upright post and the mast on the tractor to flexibly support the harvesting equipment in advance of the tractor, and means for inflexibly connecting said harvesting equipment to said tractor in a raised position with respect to the ground surface.

4. Harvesting equipment, comprising: a tractor having a mast thereon, push bars extending forwardly of the tractor and pivotally connected thereto, a frame including crop cutting and handling means connected to said push bars in advance of the tractor, an upright post on said frame having a fixed relation to the push bar, and a resilient link connected to and extending between the mast on the tractor and the upright post to flexibly support said frame and means associated therewith in advance of the tractor.

5. Harvesting equipment, comprising: a tractor having a mast thereon, push bars extending forwardly of the tractor and pivotally connected thereto, a frame including crop cutting and handling means connected to said push bars in advance of the tractor, an upright post on said frame, having a fixed relation to the push bar, a resilient link connected to and extending between the mast on the tractor and the upright post to flexibly support said frame and means associated therewith in advance of the tractor, and means for inflexibly connecting said harvesting equipment to said tractor in a raised position with respect to the ground surface.

6. A supporting frame for harvesting equipment for use with a tractor, said frame comprising: a mast carried by said tractor, a push bar pivotally connected to said tractor and extending forwardly to and rigidly connected with the frame of the harvesting equipment, an upright post on the harvesting equipment frame in opposition to the mast on the tractor, a vertical guideway on each the mast and the upright post, means movable along each said guideway for variable positioning therealong, and a resilient link connected to and extending between said last-mentioned movable means to flexibly support the harvesting equipment in advance of the tractor.

7. A supporting frame for harvesting equipment for use with a tractor, said frame comprising: a mast carried by said tractor, a push bar pivotally connected to said tractor and extending forwardly to the frame of the harvesting equipment, an upright post on the harvesting equipment frame in opposition to the mast on the tractor, a vertical slideway on each the mast and the upright post, a slider movable along each said slideway, means for securing each said slider in a desired position along the slideway, and a resilient link connected to and extending between said slider to flexibly support the harvesting equipment in advance of the tractor.

8. A supporting frame for harvesting equipment for use with a tractor, said frame comprising: a mast carried by said tractor, a push bar pivotally connected to said tractor and extending forwardly to the frame of the harvesting equipment, an upright post on the harvesting equipment frame in opposition to the mast on the tractor, and tension springs connected to and extending between said upright post and the mast on the tractor to flexibly support the harvesting equipment in advance of the tractor.

9. A supporting frame for harvesting equipment for use with a tractor, said frame comprising: a mast carried by said tractor, a push bar pivotally connected to said tractor at a point in advance of said mast, said push bar extending forwardly to and connected with the frame of the harvesting equipment, an upright post on the harvesting equipment frame in opposition to the mast on the tractor, means for maintaining a desired angular relationship between said push bar and post, and a resilient link connected to and extending between said upright post and the mast on the tractor to flexibly support the harvesting equipment in advance of the tractor.

10. A supporting frame for harvesting equipment for use with a tractor, said frame comprising: a beam laterally attached to the tractor frame and having forwardly extending horns thereon, a mast carried by said beam, a push bar pivotally connected to each said horn on the beam and extending forwardly to and connected with the frame of the harvesting equipment, an upright post on the harvesting equipment frame in opposition to the mast on the beam, means for maintaining a desired angular relationship between said push bar and post, and a resilient link connected to and extending between said upright post and mast to flexibly support the harvesting equipment in advance of the tractor.

11. A supporting frame for harvesting equipment for use with a tractor, comprising the following elements: a mast carried by said tractor, a post on the harvesting equipment, a push bar pivotally connected to said mast and extending forwardly and connected to said post to carry the harvesting equipment, means for maintaining a desired angular relationship between said push bar and said post, and resilient means connected to and extending between two of the foregoing elements in a manner to urge said post and harvesting equipment upward.

12. A supporting frame for harvester equipment for use with a tractor, said frame comprising: a push bar connected to the tractor and extending to and connected with said equipment, one of said connections being pivotal, and a resilient link connected to said tractor at one end and to said equipment at the other end, said pivotal connection being below the resilient link to upwardly urge the equipment.

HORACE D. HUME.